United States Patent Office 2,772,286
Patented Nov. 27, 1956

2,772,286

EPOXYBENZ[CD]INDOLES AND THE PREPARATION THEREOF

Eugene J. Fornefeld, Indianapolis, Ind., assignor to Eli Lilly and Company, Indianapolis, Ind., a corporation of Indiana No Drawing. Application December 10, 1954,
Serial No. 474,606

16 Claims. (Cl. 260—319)

This invention relates to novel organic compounds and more particularly to certain 1-acyl-4,5-epoxy-polyhydrobenz[cd]indoles, to processes for their preparation, and to new intermediate compounds involved in the said processes.

Included within the scope of this invention are acylated bases which can be represented by the formula

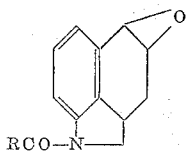

wherein R represents a member of the group consisting of alkyl radicals having from one to eight carbon atoms, monocarbocyclic aromatic, monocarbocyclic aromatic-substituted lower alkyl and lower alkyl-substituted monocarbocyclic aromatic radicals.

Broadly speaking, the acylated epoxy-polyhydrobenz[cd]indoles of the invention are obtained by preparing correspondingly acylated 1,2,2a,3-tetrahydrobenz[cd]indoles, followed by epoxidation with a suitable epoxidizing agent, as for example, perbenzoic acid. The following series of equations, in which R has the same significance as hereinabove and X represents a halogen of the group consisting of chlorine and bromine, illustrates the preparation of the compounds of the invention, and of the acylated 5-hydroxy-hexahydrobenz[cd]indoles, 5-halo-hexahydrobenz[cd]indoles and 1,2,2a,3-tetrahydrobenz[cd]indoles which are intermediate compounds in the process for preparing the compounds of the invention.

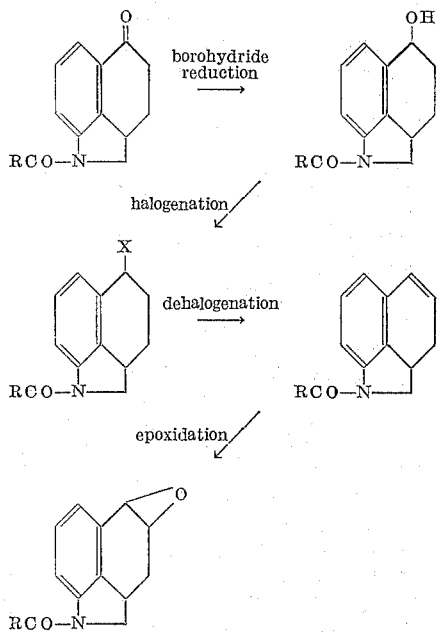

As will be seen from the formulae, a 1-acyl-5-keto-1,2,2a,3,4,5-hexahydrobenz[cd]indole is hydrogenated with an alkali metal borohydride to produce the corresponding 1-acyl-5-hydroxy-1,2,2a,3,4,5-hexahydrobenz[cd]indole, which upon halogenation with a chlorinating or brominating agent, produces a 1-acyl-5-halo-1,2,2a,3,4,5-hexahydrobenz[cd]indole. When treated with a dehalogenating agent, for example, a tertiary amine such as lutidine, the halo compound yields the corresponding 1-acyl-1,2,2a,3-tetrahydrobenz[cd]indole, and this compound, when subjected to the action of an epoxidizing agent, produces the desired 1-acyl-4,5-epoxy-1,2,2a,3,4,5-hexahydrobenz[cd]indole.

The series of reactions set forth hereinabove is intended to be illustrative only, and various modifications will be apparent to those skilled in the art. Thus, for example, successive reaction steps may be combined wherever the by-products of a reaction step are eliminated in the course of the reaction, or are noninterfering with succeeding manipulations, and the like.

The compounds of this invention are useful intermediates in the synthesis of organic compounds having polyhydrobenz[cd]indole nuclei. They are especially useful for the synthesis of compounds having the ring system of the ergot alkaloids, for example, lysergic acid. The acylated 4,5-epoxy-polyhydrobenz[cd]indoles which are produced according to the scheme of reaction set forth hereinabove can be treated with an alkylaminoacetone ketal to form a 1-acyl-4-(N-alkyl-N-acetonyl)-amino-5-hydroxy-1,2,2a,3,4,5-hexahydrobenz[cd]indole ketal, which after oxidation and treatment with strong acid, forms the corresponding 4-(N-alkyl-N-acetonyl)-amino-5-keto-1,2,2a,3,4,5-hexahydrobenz[cd]indole, according to the processes disclosed in copending application Serial No. 468,564, filed November 12, 1954. These compounds can be further treated by ring closure and other procedures disclosed in copending application Serial No. 458,674, filed September 27, 1954, to produce lysergic acid and N-alkyl homologues thereof.

The following examples further illustrate the preparation and physical properties of the new acylated 4,5-epoxypolyhydrobenz[cd]indoles of the invention, the process for their preparation, and the intermediate substances useful in that process.

Example 1

Preparation of 1-benzoyl-5-keto-1,2,2a,3,4,5-hexahydrobenz[cd]indole.

A mixture of 118 g. (0.4 mol) of N-benzoylindoline-3-propionic acid, prepared according to the method of Robinson, J. Chem. Soc. 1931, 3158, and 200 ml. of thionyl chloride was allowed to stand at room temperature for one-half hour, and thereafter was warmed on a steam bath for about twenty minutes. The excess thionyl chloride was evaporated in vacuo, and the residue comprising N-benzoylindoline-3-propionyl chloride was dissolved in 200 ml. of dry carbon disulfide. The solution was added in a thin stream to a vigorously stirred suspension of 240 g. of aluminum chloride in 1750 ml. of carbon disulfide. The mixture was refluxed and stirred for one hour and treated with a mixture of 500 g. of ice, 250 ml. of concentrated hydrochloric acid, and 500 ml. of water. The mixture was stirred during the addition of the ice mixture and was cooled by intermittently distilling a portion of the carbon disulfide in vacuo. After addition of all of the ice mixture, the carbon disulfide remaining was distilled in vacuo and the aqueous residue was extracted with 2 liters of benzene. The benzene extract was dried over magnesium sulfate and evaporated in vacuo to a small volume. Several volumes of petroleum ether were added slowly to the concentrate whereupon a yellow crystalline precipitate of 1-benzoyl-5-keto-1,2,2a,3,4,5-hexahydrobenz[cd]-indole separated. The precipitate was filtered off, washed with petroleum ether, and recrystallized from benzene-petroleum ether mixture. After recrystallization from benzene-petroleum ether mixture, it melted at about 146–147° C.

Other N-acylindoline-3-propionic acids can be employed in the above procedure to produce the corresponding 1-acyl derivatives of 5-keto-1,2,2a,3,4,5-hexahydrobenz[cd]indole. For example, when N-acetylindoline-3-propionic acid is used, 1-acetyl-5-keto-1,2,2a,3,4,5-hexahydrobenz[cd]indole, melting at about 174.5–176.5° C., is obtained. Similarly prepared are the 1-propionyl, 1-caproyl, 1-n-heptanoyl, 1-acetyl, 1-phenylacetyl, 1-p-ethylbenzoyl and the like acyl derivatives of 5-keto-1,2,2a,3,4,5-hexahydrobenz[cd]indole.

*Example 2*

Preparation of 1 - benzoyl - 5 - hydroxy - 1,2,2a,3,4,5-hexahydrobenz[cd]indole.

A solution of 2.5 g. of sodium borohydride in 120 ml. of absolute ethanol was added dropwise to a stirred, refluxing solution of 25 g. of 1-benzoyl-5-keto-1,2,2a,3,4,5-hexahydrobenz[cd] in 200 cc. of absolute ethanol during about one-half hour. Refluxing was continued for about one hour, after which 50 ml. of 10 percent aqueous sodium hydroxide were added, and heating was continued for about one-half hour. The solution was cooled and then poured into 350 ml. of 6N hydrochloric acid. The alcohol was removed by distillation in vacuo, yielding a precipitate of 1-benzoyl-5-hydroxy-1,2,2a,3,4,5-hexa-hydrobenz[cd]indole. The precipitate was removed by filtration, and after drying in air, melted at about 182–183° C.

In place of the sodium borohydride used in the above procedure there can be employed other alkali metal borohydrides, such as potassium borohydride, lithium borohydride and the like. Other solvents such as methanol, isopropanol and the like can also be used. Other acylated 5-keto-polyhydrobenz[cd]indoles, for example, those described in Example 1, can be hydrogenated by the procedure of this example. There are obtained in this manner the corresponding 1-propionyl-5 - hydroxy - 1,2,2a,3,4,5 - hexahydrobenz[cd]indole, 1-caproyl - 5 - hydroxy - 1,2,2a,3,4,5 - hexahydrobenz[cd]-indole, 1 - n - heptanoyl - 5 - hydroxy - 1,2,2a,3,4,5-hexahydrobenz[cd]indole, 1 - acetyl - 5 - hydroxy-1,2,2a,3,4,5 - hexahydrobenz[cd]indole, 1 - phenylacetyl-5 - hydroxy - 1,2,2a,3,4,5 - hexahydrobenz[cd]indole and 1 - p - ethylbenzoyl - 5 - hydroxy - 1,2,2a,3,4,5 - hexahydrobenz[cd]indole, respectively.

*Example 3*

Preparation of 1 - benzoyl - 5 - bromo - 1,2,2a,3,4,5-hexahydrobenz[cd]indole.

A solution of 39.5 g. of 1 - benzoyl - 5- hydroxy-1,2,2a,3,4,5 - hexahydrobenz[cd]indole in 400 ml. of benzene was cooled in ice while 25 ml. of phosphorous tribromide were added slowly with stirring. The solution was allowed to stand overnight at room temperature and was then gently refluxed for four hours. The reaction mixture was thereafter cooled and poured over cracked ice. The resulting organic layer was removed, and the aqueous layer was washed with a mixture of equal parts of ether and benzene. The combined organic layer and washings were washed well with water and 5 percent sodium carbonate solution, and the organic solvents were evaporated in vacuo. A residue comprising 1-benzoyl-5-bromo-1,2,2a,3,4,5-hexahydrobenz[cd]indole was obtained, melting at about 107–110° C. Preferably the 1-benzoyl - 5 - bromo - 1,2,2a,3,4,5 - hexahydrobenz[cd]-indole is not further purified, but is used directly in the procedure of the following example.

By treating other acylated 5-hydroxy-1,2,2a,3,4,5-hexahydrobenz[cd]indoles, prepared as described in Example 2, with phosphorous tribromide in accordance with the procedure of this example, there are produced the corresponding 5-bromo derivatives thereof. Thus there are prepared the 1 - propionyl - 5 - bromo - 1,2,2a,3,4,5-hexahydrobenz[cd]indole, 1 - caproyl - 5 - bromo-1,2,2a,3,4,5 - hexahydrobenz[cd]indole, 1 - n - heptanoyl-5 - bromo - 1,2,2a,3,4,5 - hexahydrobenz[cd]indole, 1-acetyl - 5 - bromo - 1,2,2a,3,4,5 - hexahydrobenz[cd]-indole, 1 - phenylacetyl - 5 - bromo - 1,2,2a,3,4,5 - hexahydrobenz[cd]indole and 1 - p - ethylbenzoyl - 5-bromo - 1,2,2a,3,4,5 - hexahydrobenz[cd]indole.

When phosphorous trichloride is used in the procedure of this example, the corresponding 1-acyl-5-chloro-1,2,2a,3,4,5 - hexahydrobenz[cd]indoles are obtained. These have substantially the same properties as their 5-bromo - substituted counterparts. Thus 1 - benzoyl-5 - chloro - 1,2,2a,3,4,5 - hexahydrobenz[cd]indole melts at about 115–125° C. Other chlorinating and brominating agents can be employed in the procedure described, such as concentrated hydrobromic acid and the like, and similarly, other inert solvents can be used herein, as exemplified by toluene, tetralin, hexane and the like.

*Example 4*

Preparation of 1-benzoyl-1,2,2a,3-tetrahydrobenz[cd]-indole.

A mixture of 36 g. of 5-bromo-1,2,2a,3,4,5-hexahydrobenz[cd]indole and 150 ml. of 2,6-lutidine was refluxed for about four hours. After cooling, the reaction mixture was poured into 400 ml. of ice-cold 6N hydrochloric acid. The aqueous mixture was extracted with three successive 200 ml. portions of 1:1 ether-benzene mixture. The combined organic solvent extracts were washed with successive portions of aqueous sodium carbonate, dilute hydrochloric acid and water. The washed ether-benzene solution was then treated with active carbon, filtered, and the solvents were removed by distillation in vacuo. The residue, consisting of 1 - benzoyl - 1,2,2a,3-tetrahydrobenz[cd]indole, was crystallized from a mixture of benzene and petroleum ether, and melted at about 91–95° C. Upon recrystallization, the melting point was 95.5–96.5° C.

Other relatively high-boiling tertiary amines, and preferably tertiary amines boiling at about 100° C. or higher, can be employed to accomplish dehalogenation by the instant procedure. Such substances are exemplified by collidine, tripropylamine, tributylamine, quinoline, dimethylaniline and the like.

The various acylated 5-chloro- and 5-bromo-polyhydrobenz[cd]indoles described in Example 3 can also be employed with the procedure of this example to produce the corresponding acylated tetrahydrobenz[cd]indoles. For example, the dehalogenation of 1-acetyl-5-bromo-1,2,2a,3,4,5-hexahydrobenz[cd]indole produces 1-acetyl-1,2,2a,3-tetrahydrobenz[cd]indole, melting at 120–121.5° C. In like manner are produced 1-propionyl-1,2,2a,3-tetrahydrobenz[cd]indole, 1 - caproyl - 1,2,2a,3-tetrahydrobenz[cd]indole, 1 - n - heptanoyl-1,2,2a,3-tetrahydrobenz[cd]indole, 1 - phenylacetyl - 1,2,2a,3 - tetrahydrobenz[cd]indole and 1-p-ethylbenzoyl-1,2,2a,3-tetrahydrobenz[cd]indole.

*Example 5*

Preparation of 1-benzoyl-4,5-epoxy-1,2,2a,3,4,5-hexahydrobenz[cd]indole.

To a cold solution of perbenzoic acid in chloroform prepared in the usual manner and standardized against sodium thiosulfate, and in amount sufficient to provide a 20 percent excess of perbenzoic acid, were added 24 g. of 1 - benzoyl - 1,2,2a,3-tetrahydrobenz[cd]indole in small portions and with thorough mixing. The solution was allowed to stand for about forty-four hours at about 0° C. The solution was washed several times with 5 percent sodium hydroxide solution, followed with washing with water. The washed solution was dried over anhydrous sodium sulfate and the chloroform was removed by distillation in vacuo. The residue, consisting of 1-benzoyl-4,5-epoxy - 1,2,2a,3,4,5 - hexahydrobenz[cd]indole, melted at about 95–100° C. after crystallization from a mixture of ethyl acetate and petroleum ether.

Alternatively, other epoxidizing agents can be employed in the procedure of this example to produce acylated 4,5-epoxyhexahydrobenz[cd]indoles. Thus, for example, there can be employed other per-acids such as monoperphthalic acid, peracetic acid, performic acid and the like. Other inert organic solvents, for example, benzene, toluene, carbon tetrachloride, hexane, decalin, and tetralin, can be used in the procedure set forth.

When other acylated tetrahydrobenz[cd]indoles such as those described in Example 4 are employed in the procedure set forth hereinabove, the corresponding acylated epoxy-hexahydrobenz[cd]indoles are obtained. Thus, epoxidation of 1-acetyl-1,2,2a,3-tetrahydrobenz[cd]indole yields 1 - acetyl - 4,5 - epoxy - 1,2,2a,3,4,5 - hexahydrobenz[cd]indole, melting at about 115–119° C. Likewise, 1-propionyl - 4,5 - epoxy-1,2,2a,3,4,5-hexahydrobenz[cd]indole, 1 - caproyl-4,5-epoxy-1,2,2a,3,4,5-hexahydrobenz-[cd]indole, 1 - n - heptanoyl - 4,5 - epoxy - 1,2,2a,3,4,5-hexahydrobenz[cd]indole, 1 - phenylacetyl - 4,5 - epoxy-1,2,2a,3,4,5 - hexahydrobenz[cd]indole and 1 - p - ethylbenzoyl - 4,5 - epoxy - 1,2,2a,3,4,5 - hexahydrobenz[cd]-indole are prepared from the respective intermediate tetrahydrobenz[cd]indoles.

I claim:

1. A compound represented by the formula

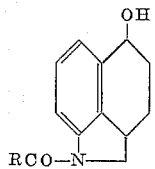

wherein R represents a member of the group consisting of alkyl radicals having from one to eight carbon atoms, phenyl, phenyl-subtituted lower alkyl, and lower alkyl-substituted phenyl radicals.

2. 1 - benzoyl - 5 - hydroxy - 1,2,2a,3,4,5 - hexahydrobenz[cd]indole.

3. A compound represented by the formula

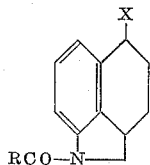

wherein R represents a member of the group consisting of alkyl radicals having from one to eight carbon atoms, phenyl, phenyl-substituted lower alkyl and lower alkyl-substituted phenyl radicals, and X represents a halogen of the group consisting of chlorine and bromine.

4. 1 - benzoyl - 5 - bromo - 1,2,2a,3,4,5 - hexahydrobenz[cd]indole.

5. A compound represented by the formula

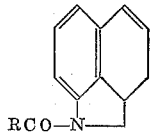

wherein R represents a member of the group consisting of alkyl radicals having from one to eight carbon atoms, phenyl, phenyl-substituted lower alkyl and lower alkyl-substituted phenyl radicals.

6. 1-benzoyl-1,2,2a,3-tetrahydrobenz[cd]indole.

7. A compound represented by the formula

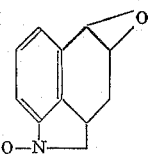

wherein R represents a member of the group consisting of alkyl radicals having from one to eight carbon atoms, phenyl, phenyl-substituted lower alkyl and lower alkyl-substituted phenyl radicals.

8. 1 - benzoyl - 4,5 - epoxy - 1,2,2a,3,4,5 - hexahydrobenz[cd]indole.

9. In the process of preparing acylated 4,5-epoxy-polyhydrobenz[cd]indoles, the step which comprises subjecting to the action of an alkali metal borohydride a 5-keto-polyhydrobenz[cd]indole represented by the formula

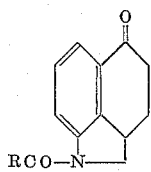

wherein R represents a member of the group consisting of alkyl radicals having from one to eight carbon atoms, phenyl, phenyl-substituted lower alkyl, and lower alkyl-substituted phenyl radicals.

10. The process step according to claim 9, wherein the 5-keto-polyhydrobenz[cd]indole is 1-benzoyl-5-keto-1,2,2a,3,4,5-hexahydrobenz[cd]indole.

11. In the process of preparing acylated 4,5-epoxy-polyhydrobenz[cd]indoles, the step which comprises halogenating in the 5 position with a halogenating agent containing a halogen selected from the group consisting of chlorine and bromine a 5-hydroxy-polyhydrobenz-[cd]indole represented by the formula

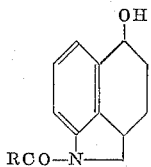

wherein R represents a member of the group consisting of alkyl radicals having from one to eight carbon atoms, phenyl, phenyl-substituted lower alkyl, and lower alkyl-substituted phenyl radicals.

12. The process step according to claim 11, wherein the 5-hydroxy-polyhydrobenz[cd]indole is 1-benzoyl-5-hydroxy-1,2,2a,3,4,5-hexahydrobenz[cd]indole.

13. In the process of preparing acylated 4,5-epoxy-polyhydrobenz[cd]indoles, the step which comprises heating with a relatively high-boiling tertiary amine a 5-halo-polyhydrobenz[cd]indole represented by the formula

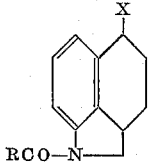

wherein R represents a member of the group consisting of alkyl radicals having from one to eight carbon atoms, phenyl, phenyl-substituted lower alkyl, and lower alkyl-substituted phenyl radicals, and X represents a halogen of the group consisting of chlorine and bromine.

14. The process step according to claim 13, wherein the 5 - halo - polyhydrobenz[cd]indole is 1 - benzoyl - 5 - bromo-1,2,2a,3,4,5-hexahydrobenz[cd]indole.

15. In the process of preparing acylated 4,5-epoxy-polyhydrobenz[cd]indoles, the step which comprises subjecting to the action of an epoxidizing agent an acylated tetrahydrobenz[cd]indole represented by the formula

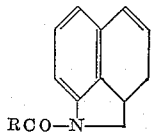

wherein R represents a member of the group consisting of alkyl radicals having from one to eight carbon atoms, phenyl, phenyl-substituted lower alkyl, and lower alkyl-substituted phenyl radicals.

16. The process step according to claim 15, wherein the acylated tetrahydrobenz[cd]indole is 1-benzoyl-1,2,2a,3-tetrahydrobenz[cd]indole.

No references cited.